W. A. GREAVES.
GEARING.
APPLICATION FILED APR. 18, 1912.
1,052,242.
Patented Feb. 4, 1913.
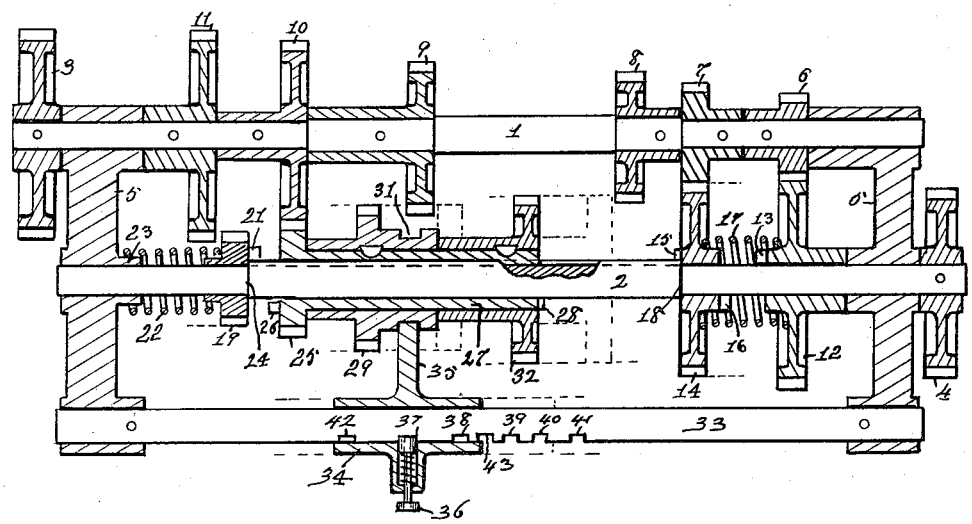
Witnesses,
William A. Greaves, Inventor,
By Robert S. Carr,
Attorney.

UNITED STATES PATENT OFFICE.

WILLIAM A. GREAVES, OF CINCINNATI, OHIO, ASSIGNOR TO GREAVES, KLUSMAN AND COMPANY, OF CINCINNATI, OHIO, A COPARTNERSHIP.

GEARING.

1,052,242. Specification of Letters Patent. Patented Feb. 4, 1913.

Application filed April 18, 1912. Serial No. 691,622.

*To all whom it may concern:*

Be it known that I, WILLIAM A. GREAVES, a citizen of the United States, residing at Cincinnati, Ohio, have invented a new and useful Improvement in Gearing, of which the following is a specification.

My invention relates to gearing of the class adapted to the use of certain kinds of machine tools or for other suitable purposes, and the objects of my improvements are to provide means for driving a shaft at different speeds from a shaft driven at a constant speed; to increase the established number of speed changes between two shafts without the use of an intermediate shaft or gears, and to provide simple, durable and compact construction and assemblage of the different members for securing facility of operation and efficiency of action. These objects may be attained in the following described manner as illustrated in the accompanying drawings, in which the figure is a diametrical longitudinal section of a gearing embodying my improvements.

In the drawings, 1 and 2 represent the driving and driven shafts provided respectively with the transmission gears 3 and 4 and journaled parallel with each other in the supports 5. Gears 6, 7, 8, 9, 10 and 11 graduated in size, are secured at proper intervals on shaft 1. Gear 12 formed with a clutch member 13 is idly mounted on one end portion of shaft 2 in continuous engagement with gear 6. Gear 14 idly mounted on shaft 2 adjacent to gear 12 is formed with a clutch member 15 on one end and with a clutch member 16 on its opposite end adapted to detachably engage with clutch member 13 on gear 12. A coiled spring 17 interposed between said idle gears serves to move and maintain gear 14 under a yielding pressure into contact with the annular shoulder 18 formed on shaft 2 and also to maintain said gear normally in engagement with gear 7 on shaft 1 and with the clutch members 13 and 16 disengaged. A gear 19 formed with a clutch member 21 is idly mounted on the opposite end portion of shaft 2 and adapted to detachably engage with gear 11 on shaft 1. A coiled spring 22 interposed between the gearing 23 and said gear serves to move and maintain it under a yielding pressure out of engagement with gear 11 and normally into contact with the annular shoulder 24 formed on shaft 2. Gear 25 adapted to detachably engage with gear 10 on shaft 1 is formed on one end with a clutch member 26 adapted to coöperate with the clutch member 21 on idle gear 19 and on the other end with an extended hub or sleeve 27 which is splined on the middle portion of shaft 2 and terminates in a clutch member 28 adapted to coöperate with the clutch member 15 on idle gear 14. A gear 29 adapted to detachably engage with gear 9 on shaft 1 and formed with an annular groove 31 in its hub and also a gear 32 adapted to detachably engage with gear 8 on shaft 1 are each secured on the sleeve 27. A shaft 33 secured at its ends in the supports 5 is provided with a sleeve 34 adapted to slide longitudinally thereon. Said sleeve is formed with a projecting yoke 35 adapted to movably engage with the annular groove 31 in the hub of gear 29. A spring actuated detent pin 36 carried by said sleeve is adapted to engage with any of the notches 37, 38, 39, 40, 41, 42 or 43 formed in shaft 33.

In operation, the sleeve may be moved with the detent into successive engagement with the notches 37, 38, and 39 for separately engaging the gears 25, 29, and 32 with the corresponding gears 10, 9 and 8 in the ordinary manner. The further movement of the sleeve in the same direction with the detent into the notch 40 disengages gear 32 from gear 8 and engages the clutch member 28 with clutch member 15 whereby the shafts 1 and 2 are connected through the gears 7 and 14. The continued movement of the sleeve compresses the spring 17 with the detent into the notch 41 and disengages the idle gear 14 from gear 7 and engages the clutch members 16 and 13 whereby the shafts are connected by gears 6 and 12. A reversal of the sleeve with the detent into notch 42 engages the clutch members 26 and 21, compresses the spring 22 and engages the idle gear 19 with gear 11. The movement of the sleeve with the detent into notch 43 serves to disengage the driving gear connections between shafts 1 and 2.

Having fully described my improvements, what I claim as my invention and desire to secure by Letters Patent of the United States is:—

1. In a gearing, the combination of two shafts, a plurality of different sized gears secured on one shaft, corresponding idle gears on the other shaft, clutch connections between said idle gears, automatic means for yieldingly maintaining said idle gears in engagement with the corresponding gears on the former shaft, and a clutch member splined on the latter shaft for successively engaging one of said gears to turn therewith disengaging it from the corresponding gear on the former shaft and moving it into clutching engagement with the other said gear.

2. In a gearing the combination of a first and a second shaft, gears secured on the first shaft, corresponding idle gears on the second shaft and formed with clutch members, a double clutch member splined on the second shaft adapted to engage alternately with said idle gears and for moving them longitudinally, and springs for automatically moving the respective said idle gears in the opposite direction on said shaft and maintaining them under a yielding pressure.

3. In a gearing, a first and a second shaft, a series of gears secured on the first shaft, a plurality of gears splined on the second shaft and movable simultaneously into successive engagement with corresponding gears of the series, an idle gear on the second shaft, means for normally maintaining it out of engagement with a corresponding gear of the said series, and clutch connections from said idle gear with the splined gears, whereby it may be driven with the second shaft, and also moved into engagement with its corresponding gear of the said series of gears.

4. A gearing comprising a shaft, a gear secured thereon, a second shaft, a loose gear thereon formed with a clutch member and adapted to engage with the former gear, automatic means for moving and maintaining the loose gear under a yielding pressure out of engagement with the former gear, and a clutch member splined on the second shaft and arranged to engage the loose gear to turn therewith and also to move it into engagement with the former gear.

WM. A. GREAVES.

Witnesses:
H. H. KLUSMAN,
WM. H. MORRIS.

Copies of this patent may be obtained for five cents each, by addressing the "Commissioner of Patents, Washington, D. C."